US00RE37149E

(19) United States
(12) Reissued Patent
Hartlohner et al.

(10) Patent Number: US RE37,149 E
(45) Date of Reissued Patent: May 1, 2001

(54) CUTTING TOOL INSERTS

(75) Inventors: Rudi Hartlohner, Tuchenbach; Franz Havrda, Grossenseebach, both of (DE)

(73) Assignee: Kennametal Inc., Latrobe, PA (US)

(21) Appl. No.: 29/113,479

(22) Filed: Sep. 24, 1999

Related U.S. Patent Documents

Reissue of:

(64) Patent No.: Des. 40,963
Issued: May 11, 1999
Appl. No.: 29/083,969
Filed: Feb. 20, 1998

(30) Foreign Application Priority Data

Aug. 21, 1997 (DE) ..... M 97 07 143

(51) LOC (6) Cl. ..... 15-09
(52) U.S. Cl. ..... D15/139
(58) Field of Search ..... D15/139; 407/113–119

(56) References Cited

U.S. PATENT DOCUMENTS

D. 305,239 12/1989 Niebauer ..... D15/139
D. 357,693 4/1995 Niebauer ..... D15/139

*Primary Examiner*—Antoine Duval Davis
(74) *Attorney, Agent, or Firm*—John J. Prizzi

(57) CLAIM

The ornamental design for a cutting tool insert, as shown and described.

DESCRIPTION

FIG. 1 is an isometric view of a cutting tool insert in accordance with a first embodiment of the subject invention;
FIG. 2 is a top plan view of FIG. 1, wherein the bottom plan view is identical;
FIG. 3 is a side elevation view from any side of the cutting tool insert in FIG. 2;
FIG. 4 is a cross-sectional view taken along lines "4—4" in FIG. 1;
FIG. 5 is an isometric view of a cutting tool insert in accordance with the second embodiment of the subject invention;
FIG. 6 is a top plan view of FIG. 5, wherein the bottom plan view is identical;
FIG. 7 is a side elevation view from any side of the cutting tool insert in FIG. 5;
FIG. 8 is a cross-section view taken along lines "8—8" in FIG. 5;
FIG. 9 is an isometric view of a cutting tool insert in accordance with a third embodiment of the subject invention;
FIG. 10 is a top plan view of FIG. 9, wherein the bottom plan view is identical;
FIG. 11 is a side elevation view looking at the right side of the cutting tool insert in FIG. 10;
FIG. 12 is a side elevation view looking at the cutting tool insert in FIG. 10 from the bottom of the page;
FIG. 13 is a cross-section view taken along lines "13—13" of FIG. 10;
FIG. 14 is a cross-section view taken along lines "14—14" of FIG. 10;
FIG. 15 is a cross-section view taken along lines "15—15" of FIG. 10;
FIG. 16 is an isometric view of a cutting insert in certain accordance with a fourth embodiment of the subject invention;
FIG. 17 is a top plan view of FIG. 16, wherein the bottom plan view is identical;
FIG. 18 is a side elevation view looking at the right side of the cutting tool insert in FIG. 17;
FIG. 19 is a side elevation view looking at the cutting tool insert in FIG. 17 from the bottom of the page;
FIG. 20 is a cross-section view taken along lines "20—20" of FIG. 17;
FIG. 21 is a cross-section view taken along lines "21—21" of FIG. 17;
FIG. 22 is a cross-section view taken along lines "22—22" of FIG. 17;
FIG. 23 is an isometric view of a cutting tool insert in accordance with a fifth embodiment of the subject invention;
FIG. 24 is a top plan view of FIG. 23, wherein the bottom plan view is identical;
FIG. 25 is a side elevation view looking at the right side of the cutting tool insert in FIG. 24;
FIG. 26 is a side elevation view looking at the cutting tool insert in FIG. 24 from the bottom of the page;
FIG. 27 is a cross-section view taken along lines "27—27" of FIG. 24;
FIG. 28 is a cross-section view taken along lines "28—28" of FIG. 24; and,
FIG. 29 is a cross-section view taken along lines "29—29" of FIG. 24.

1 Claim, 27 Drawing Sheets

Figure 1:
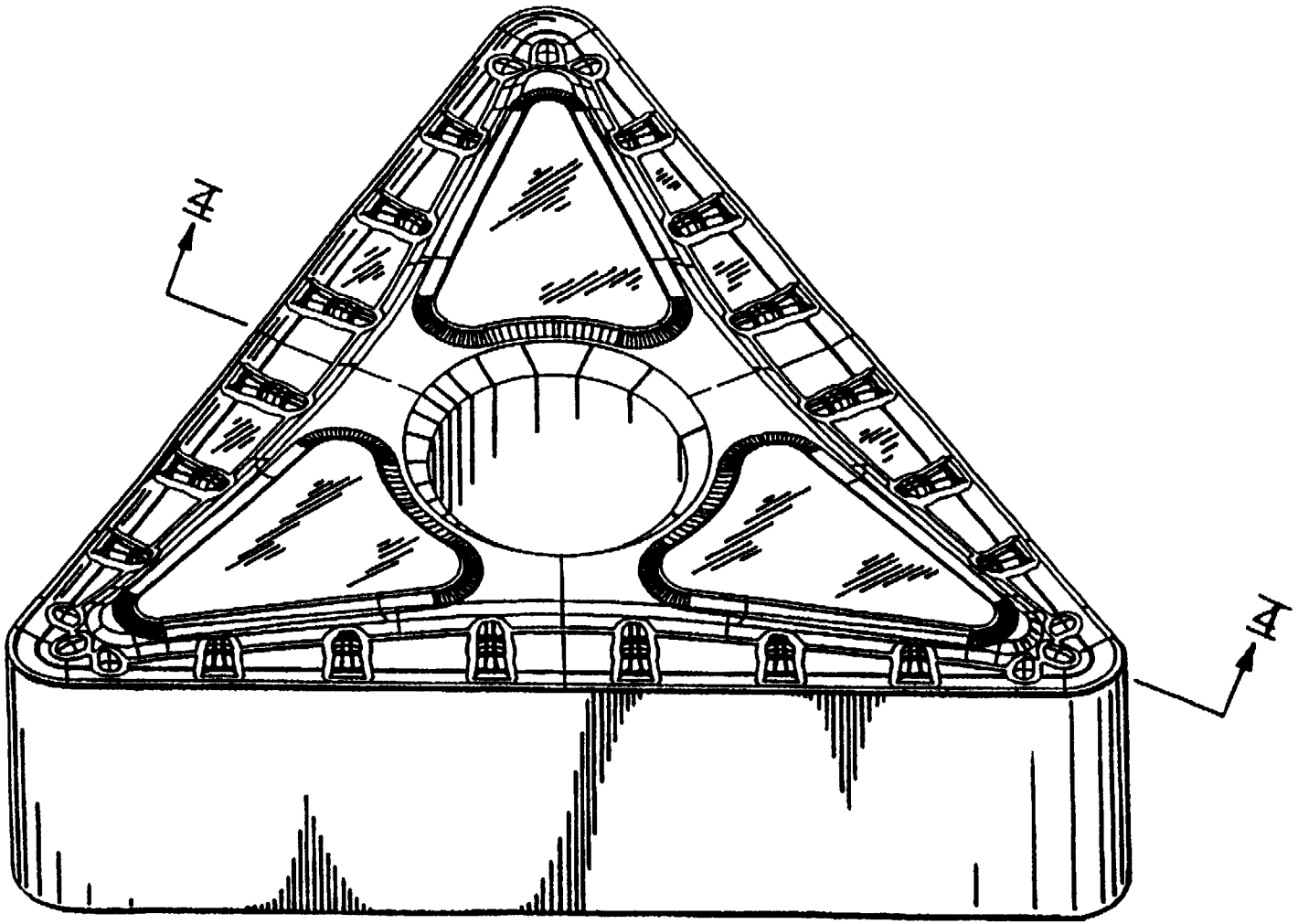
Figure 2:
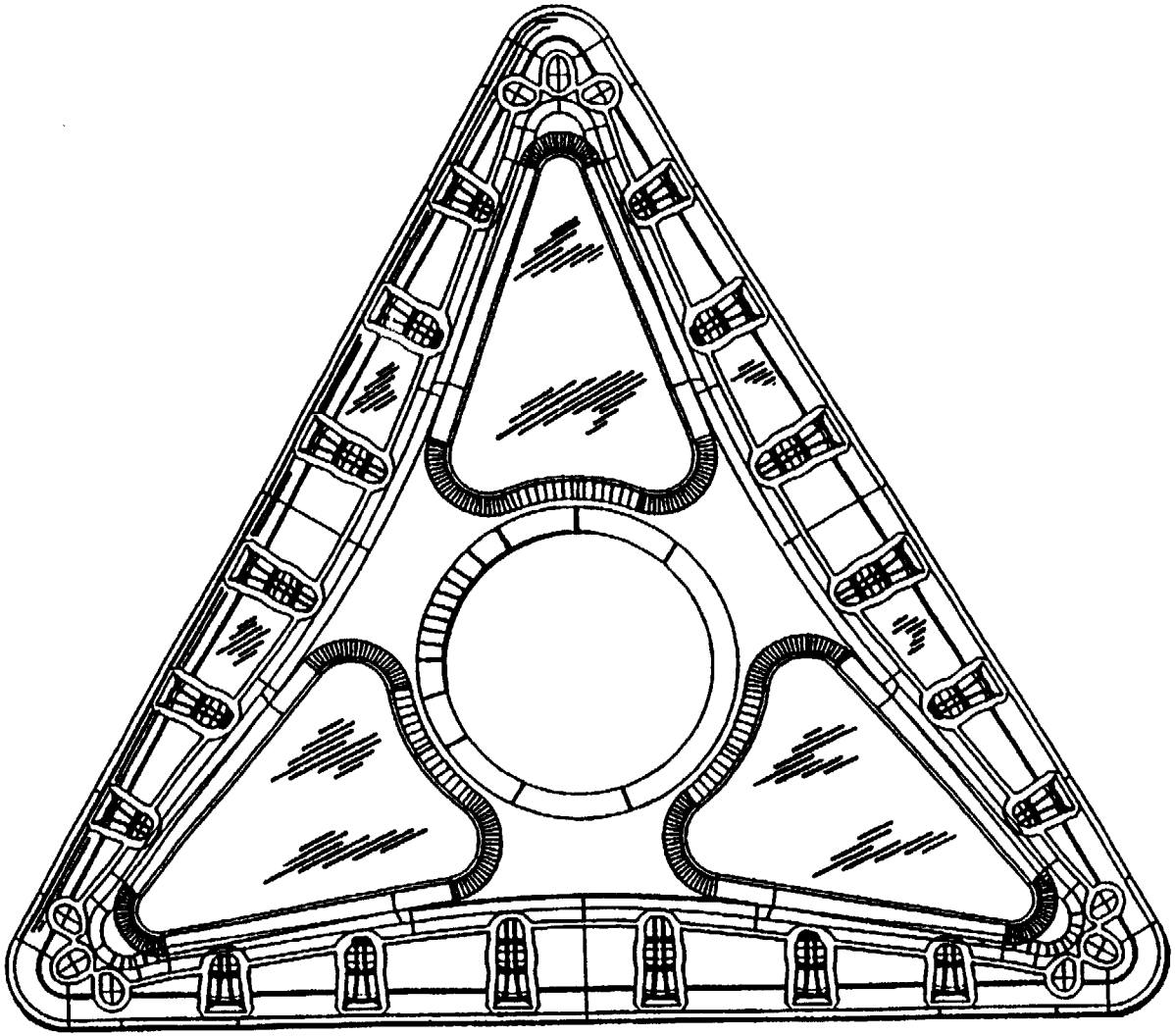
Figure 3:
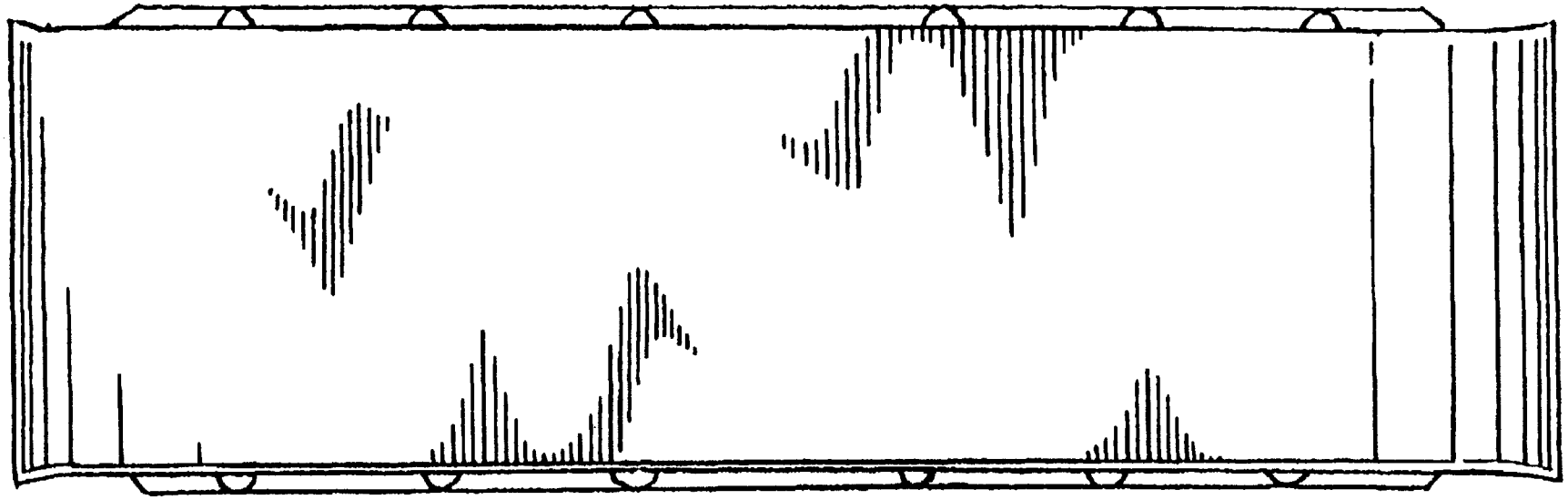
Figure 4:
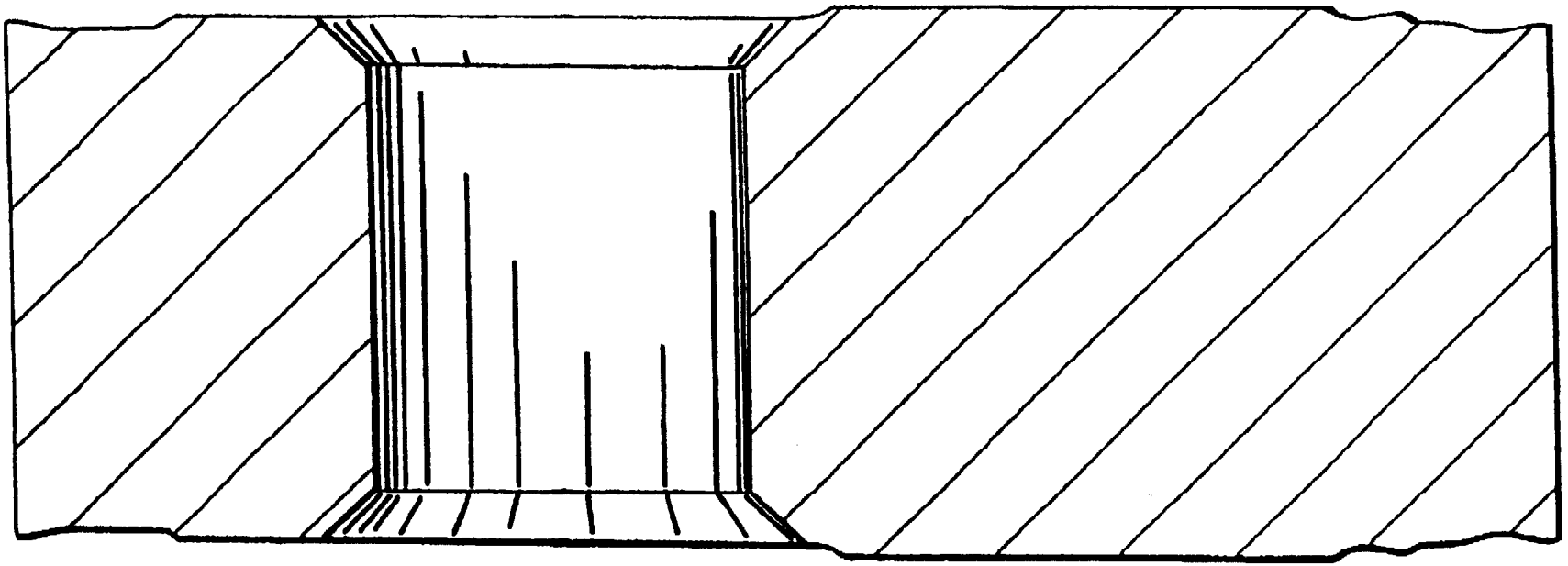
Figure 5:
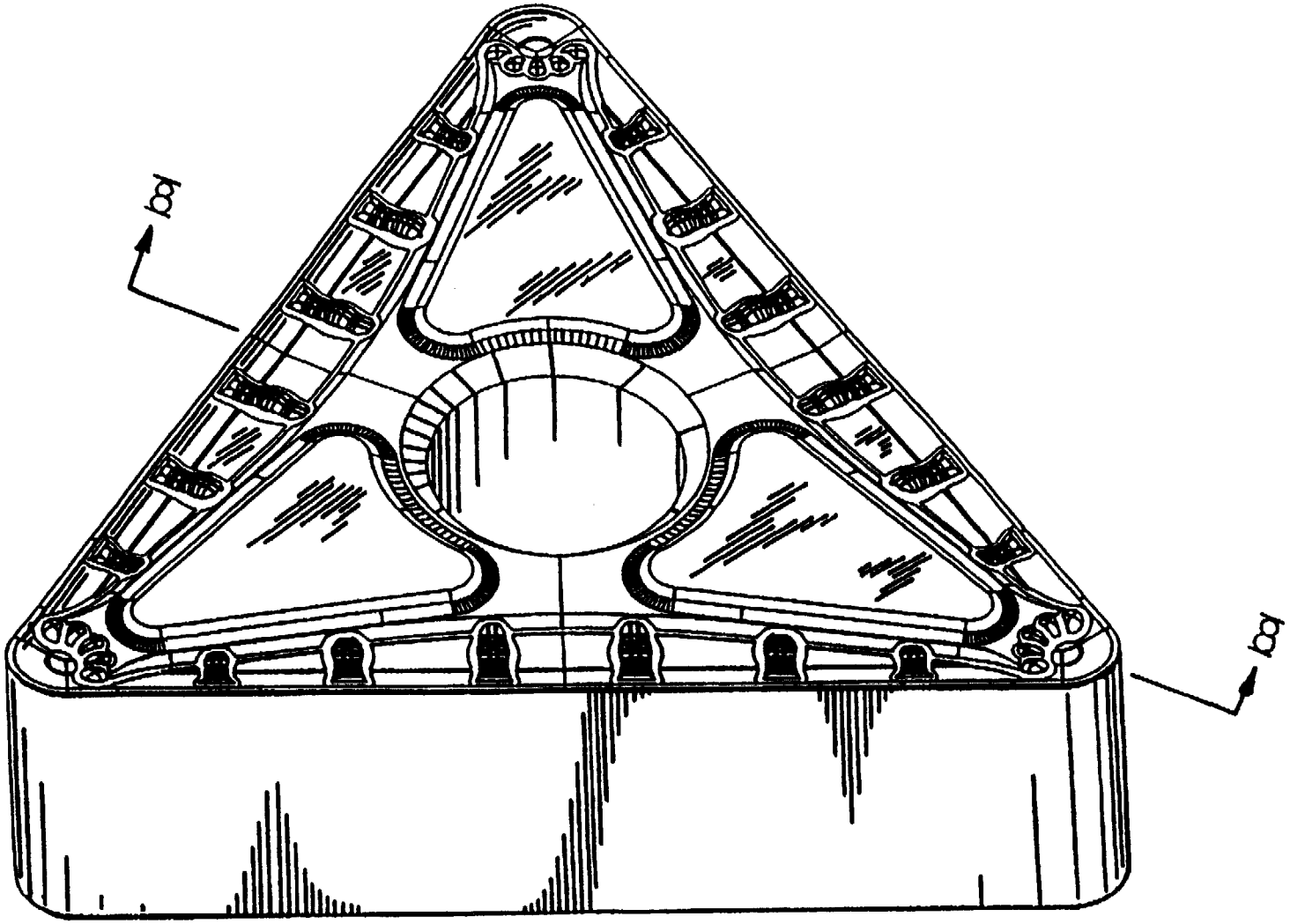
Figure 6:
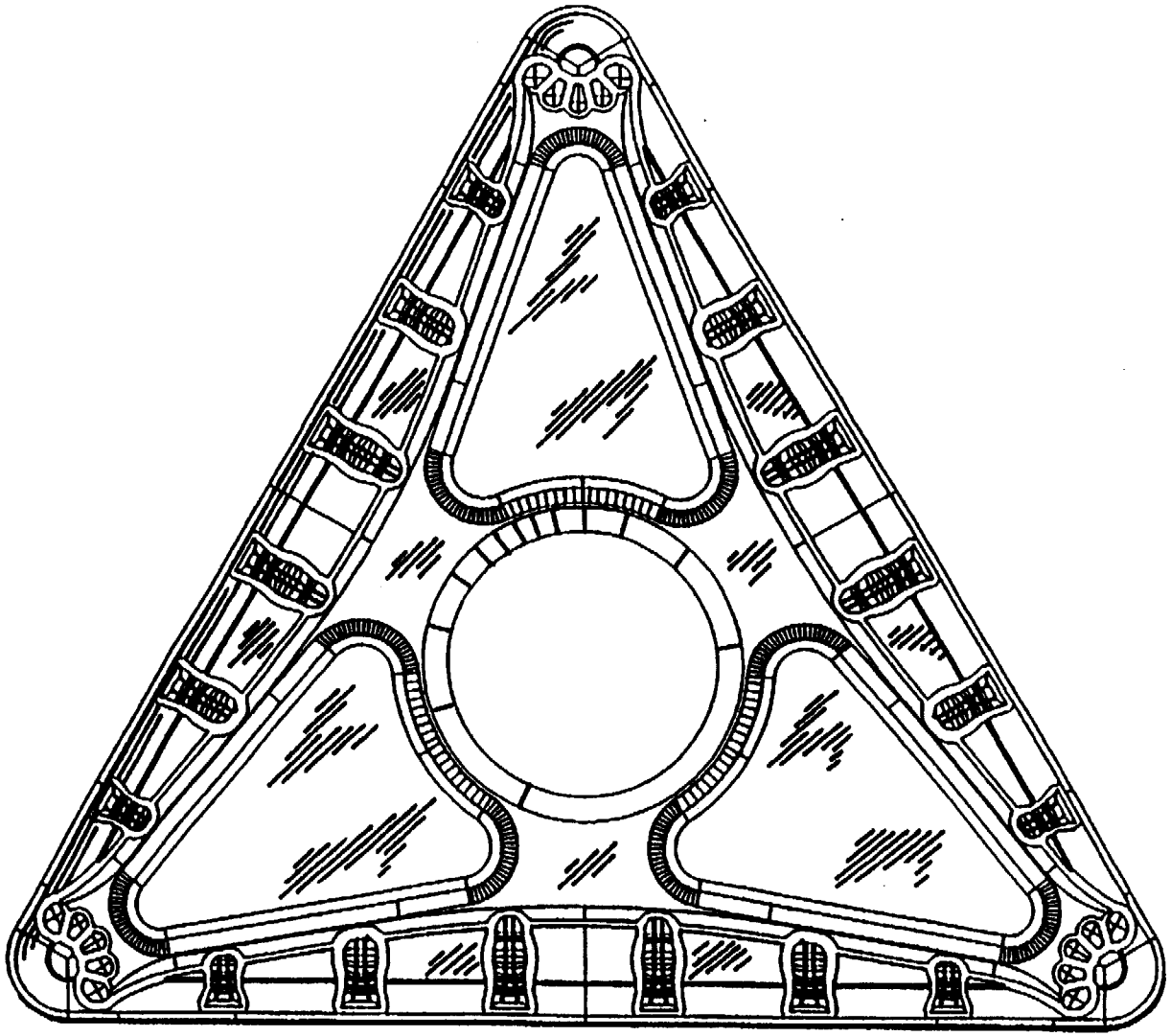
Figure 7:
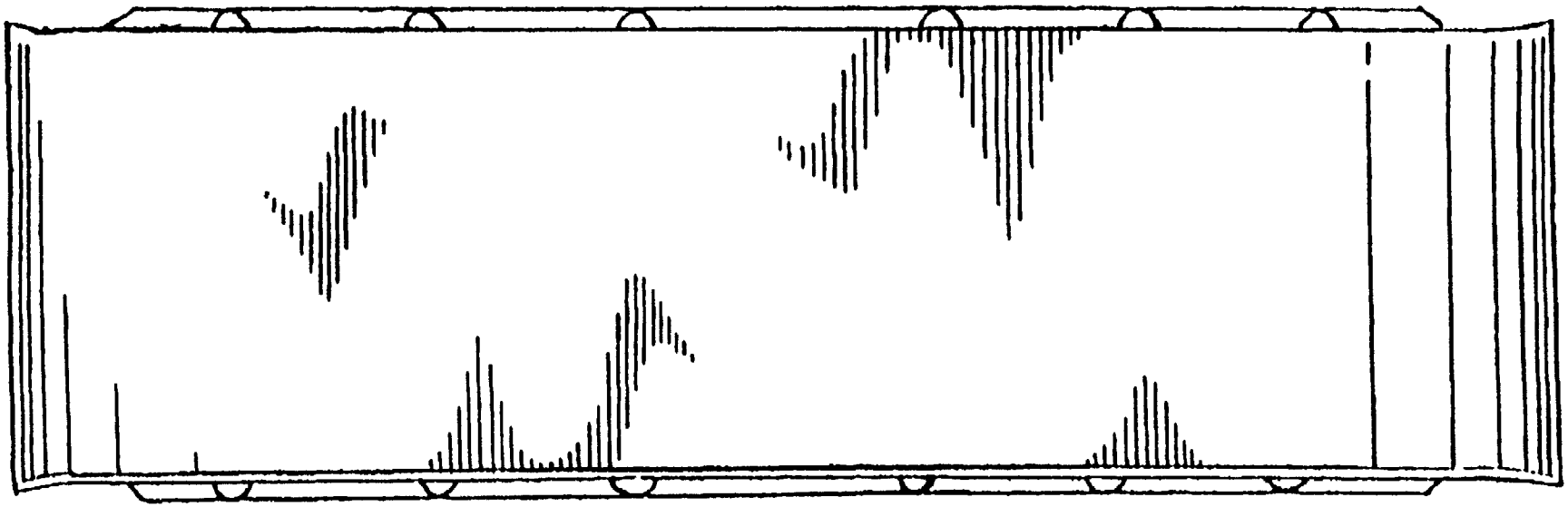
Figure 8:
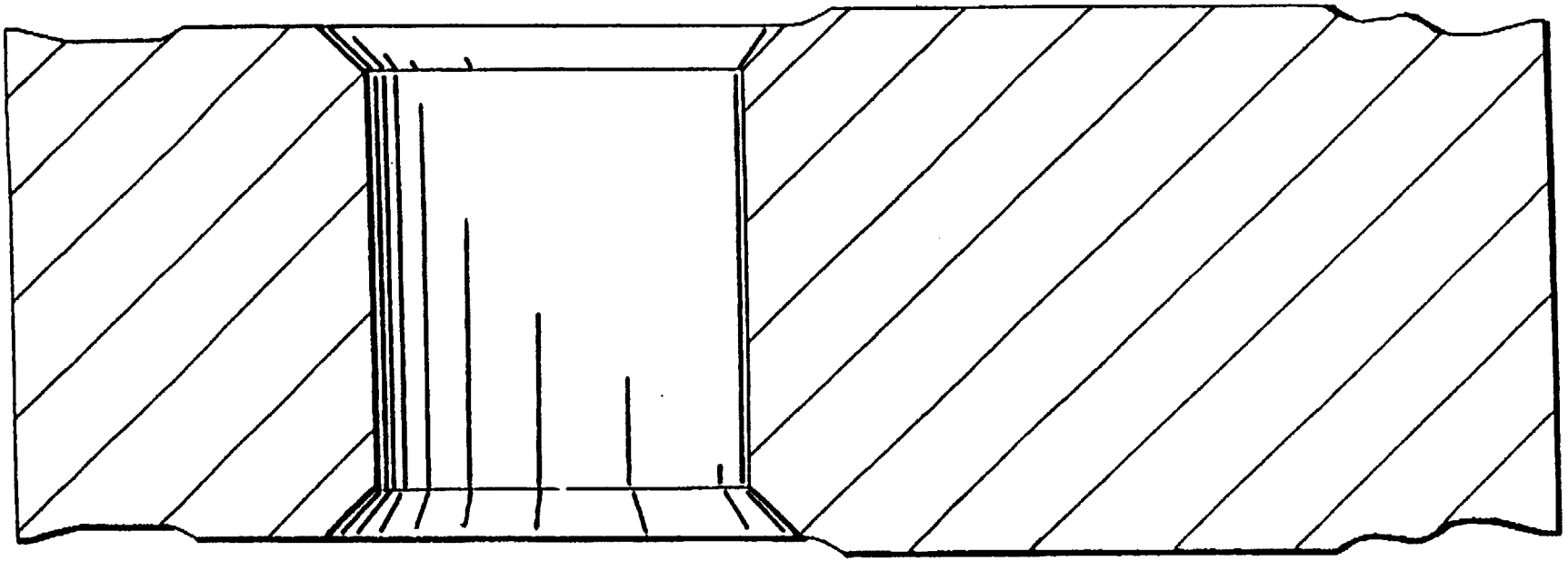
Figure 9:
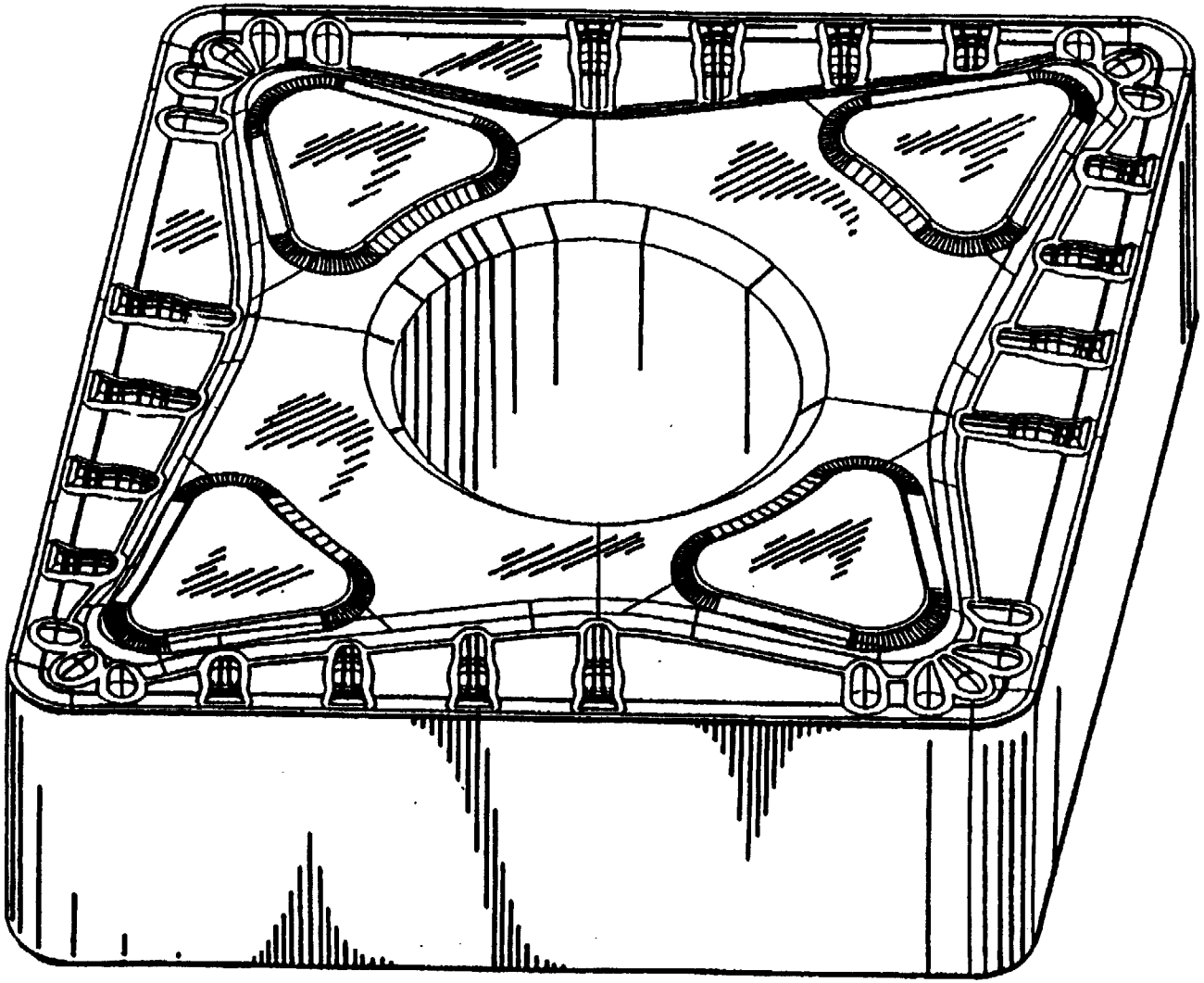
Figure 10:
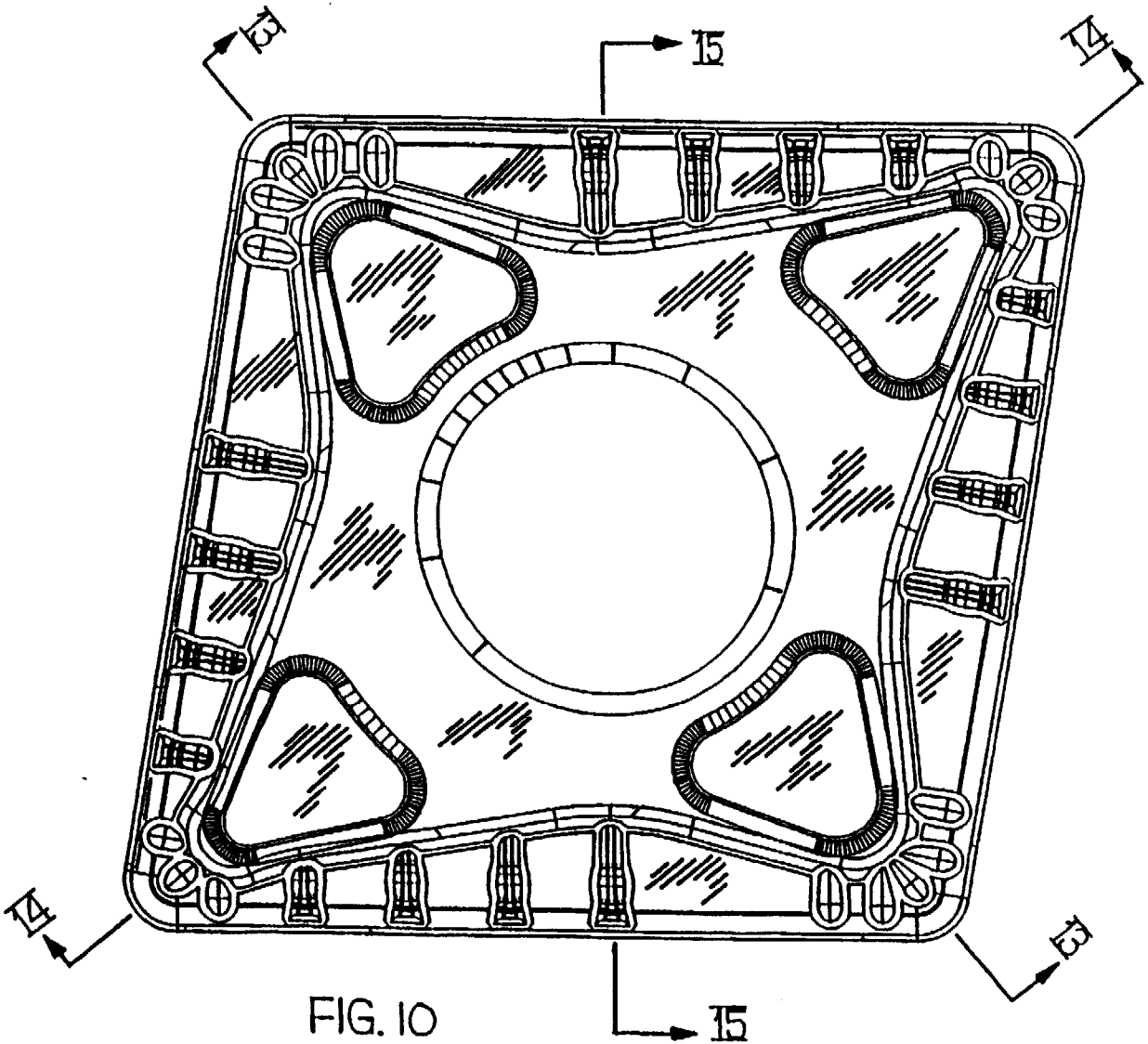
Figure 11:
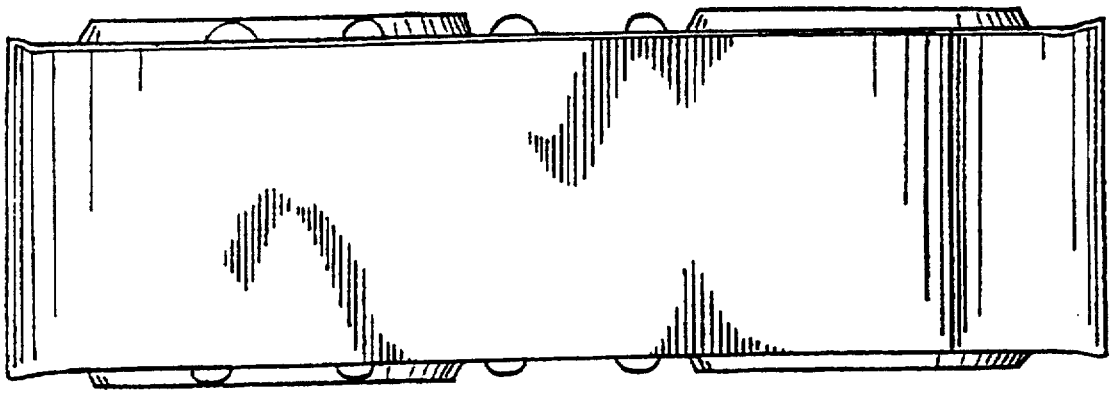
Figure 12:
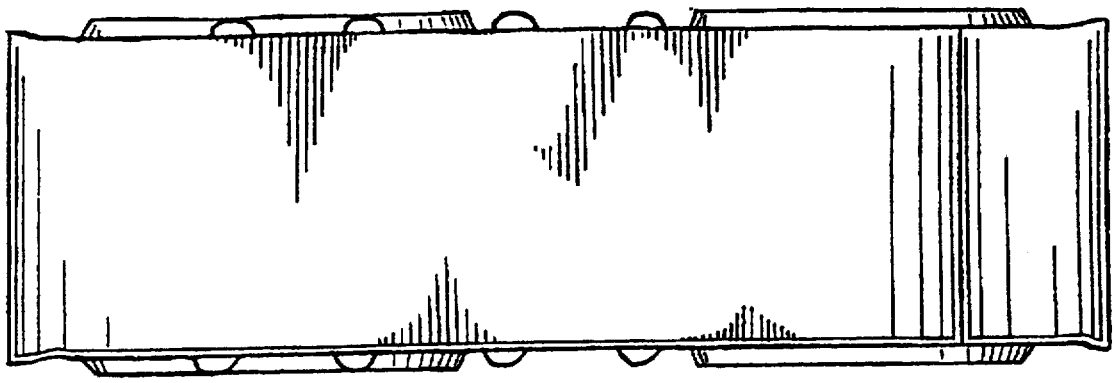
Figure 13:
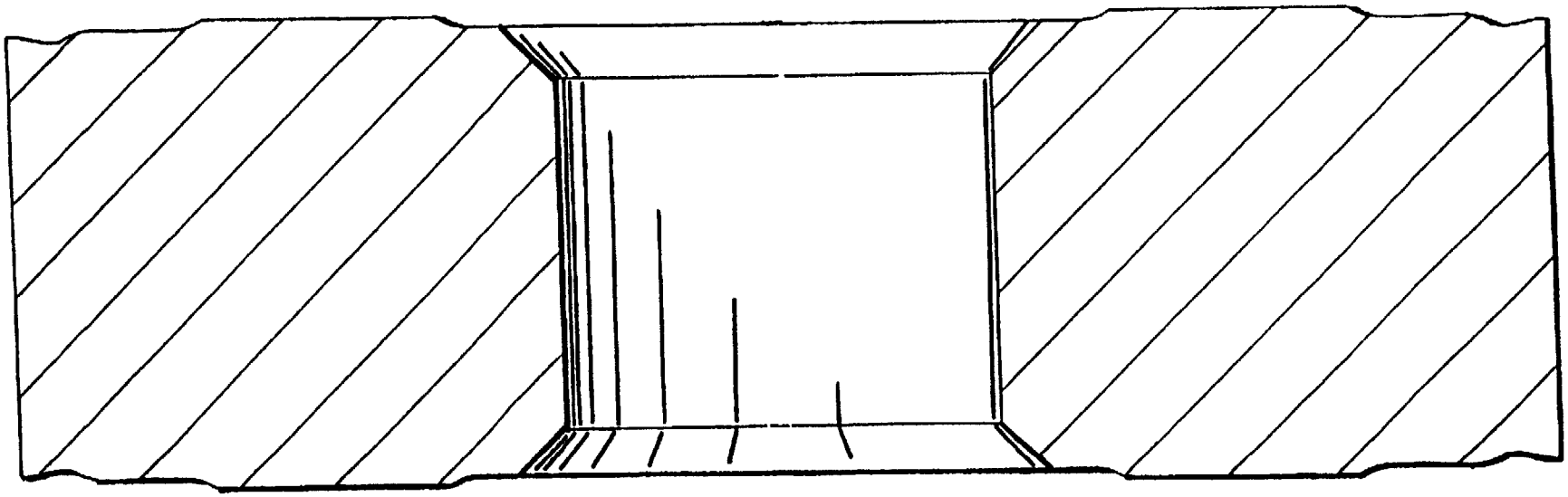
Figure 14:
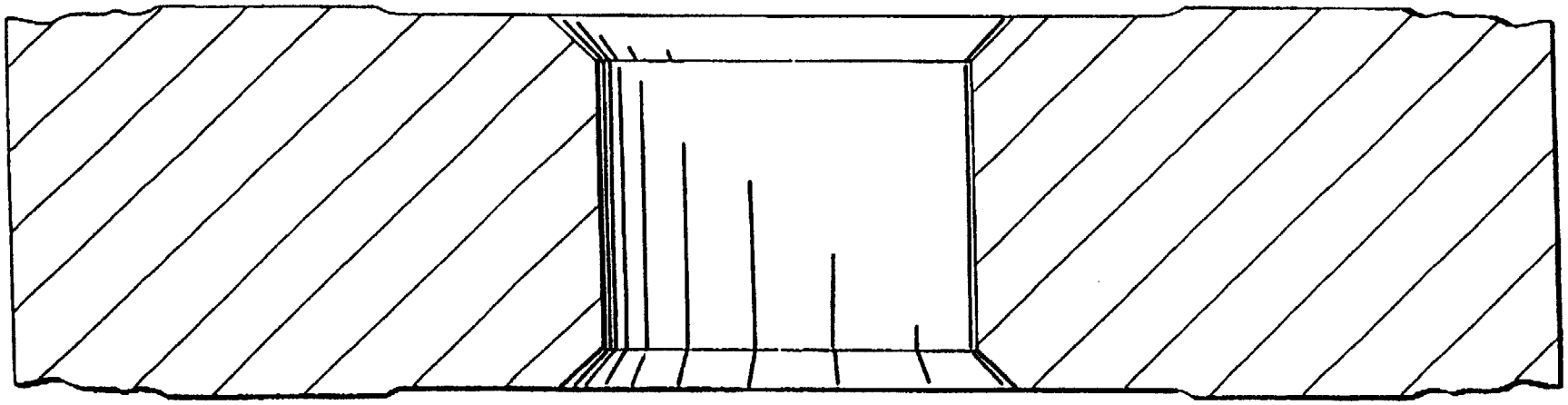
Figure 15:
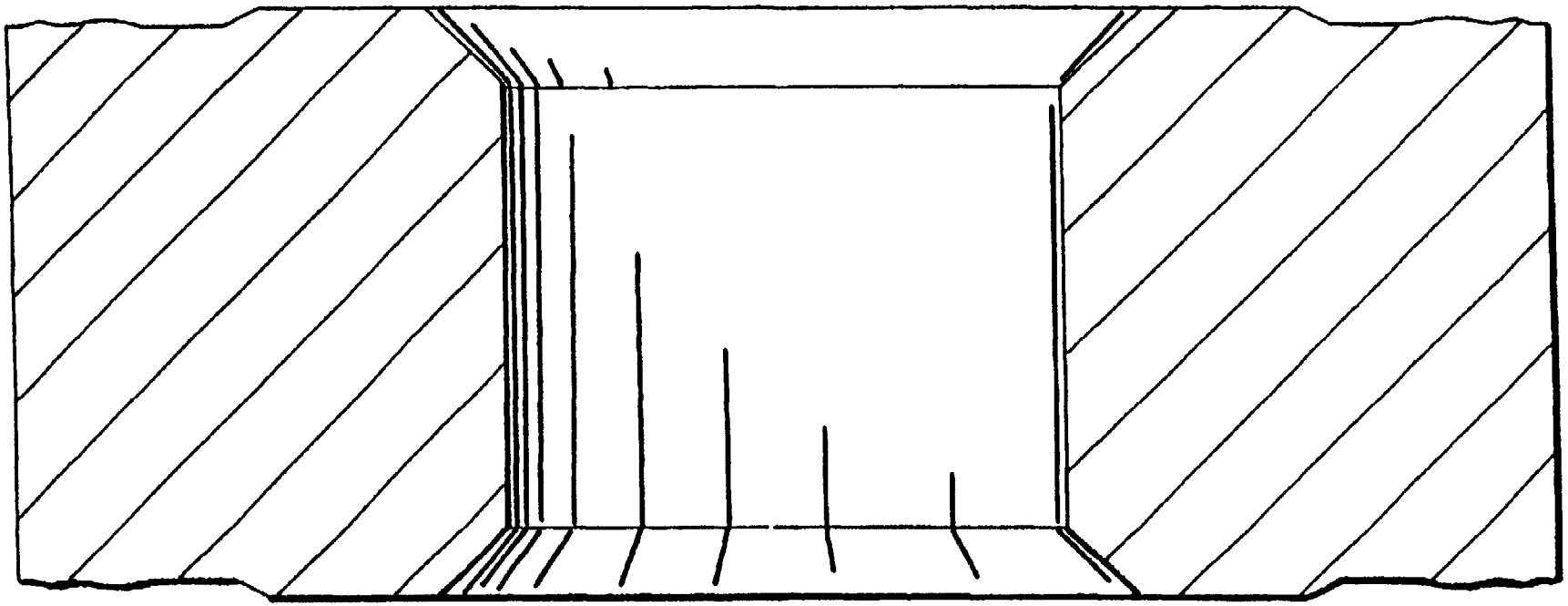
Figure 16:
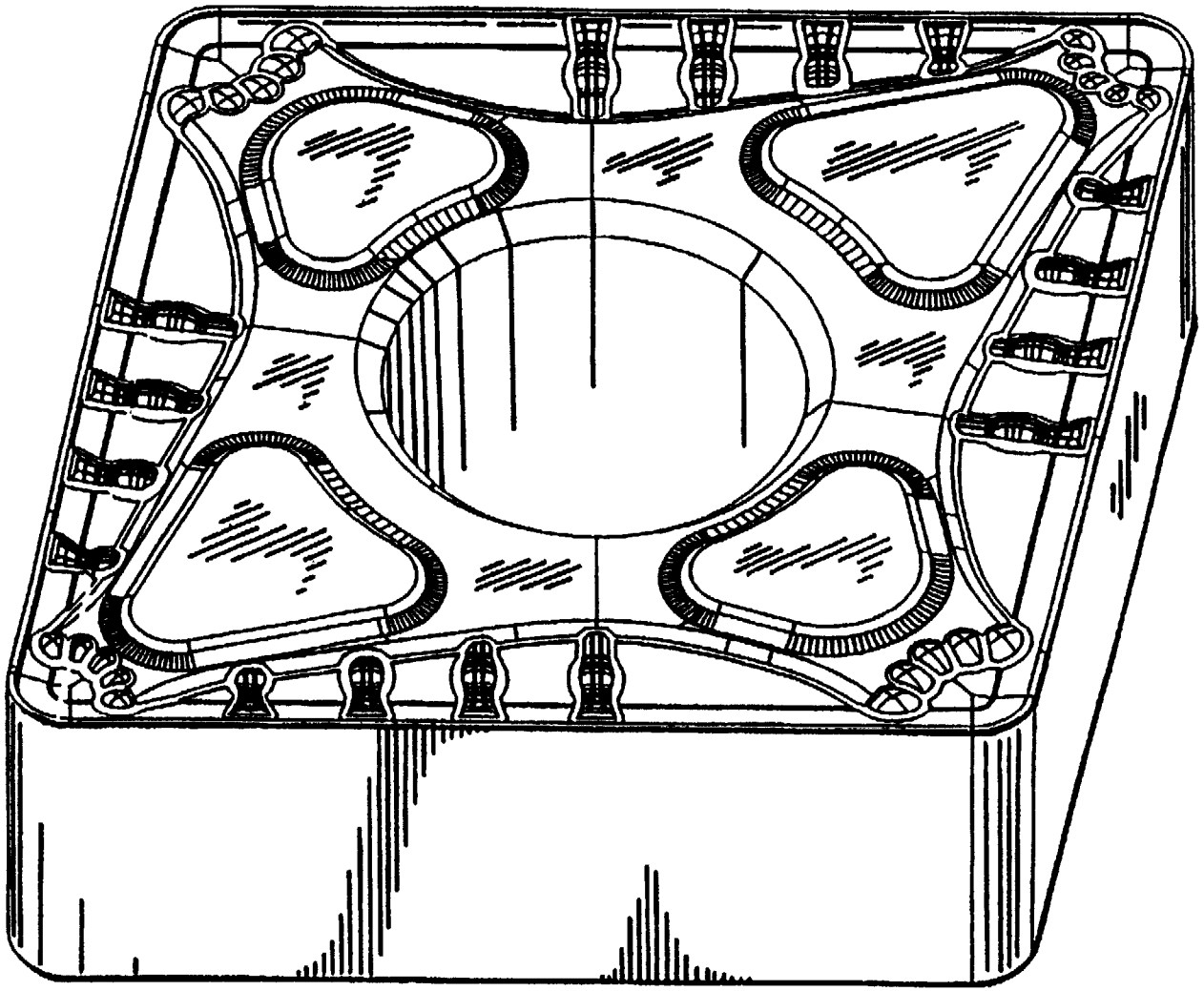
Figure 17:
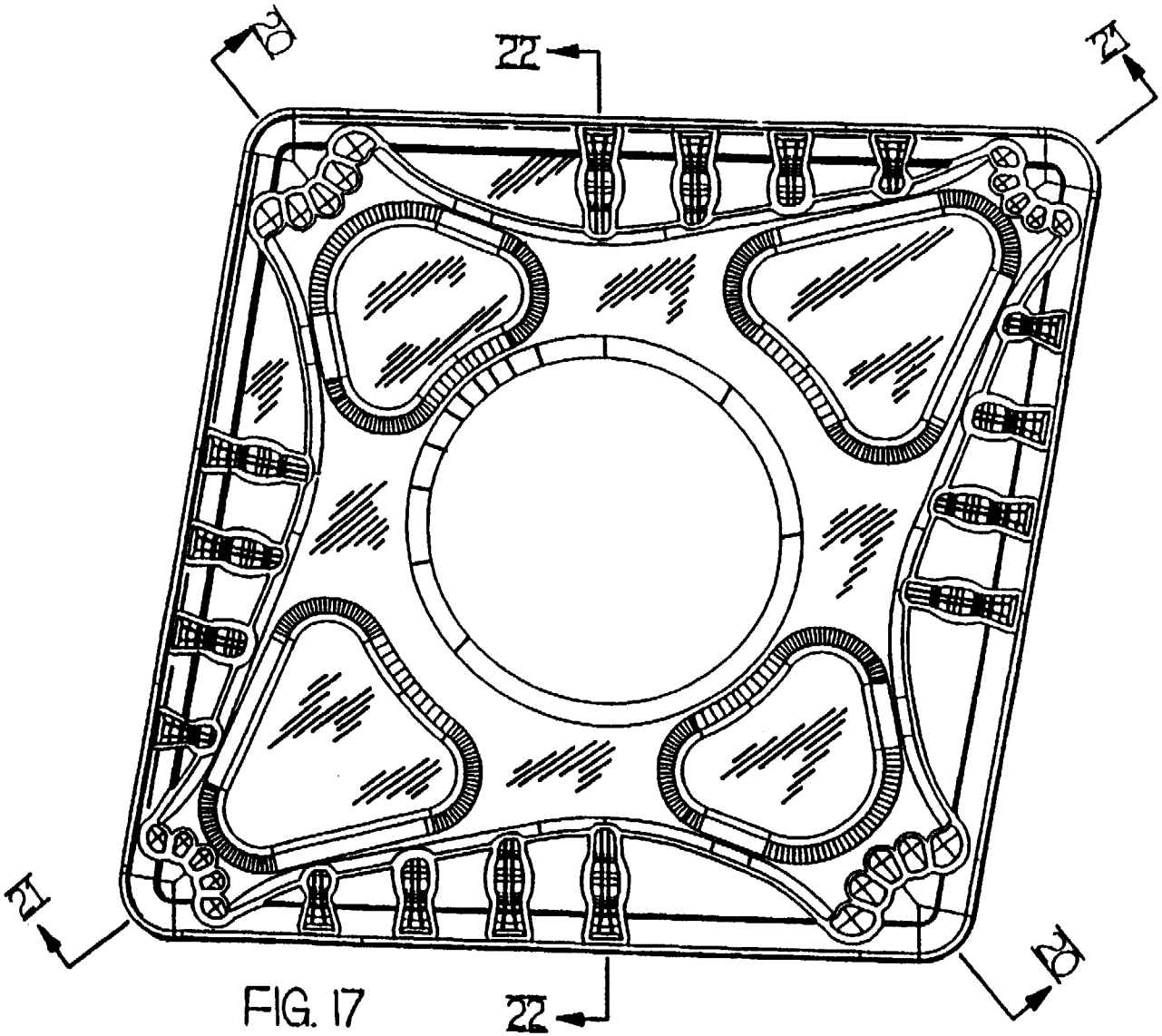
Figure 18:
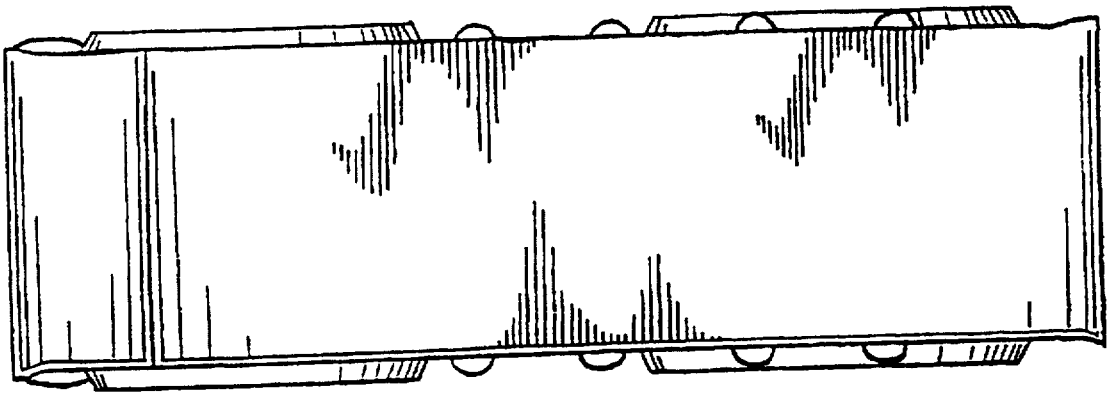
Figure 19:
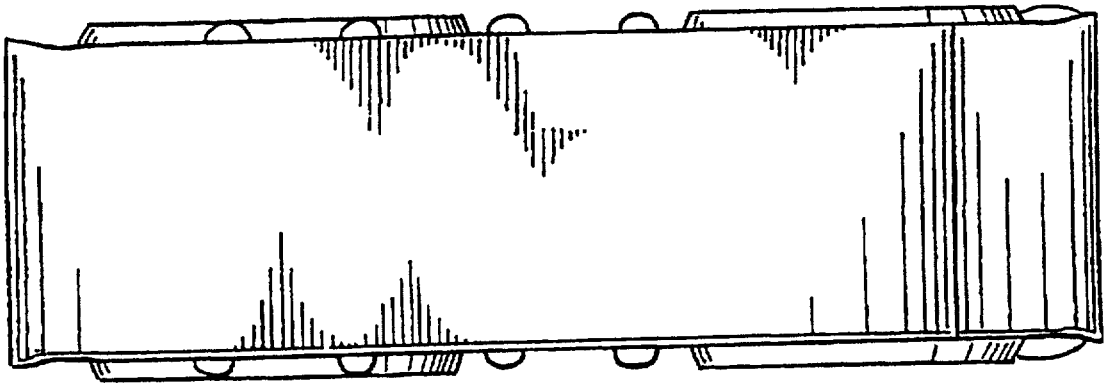
Figure 20:
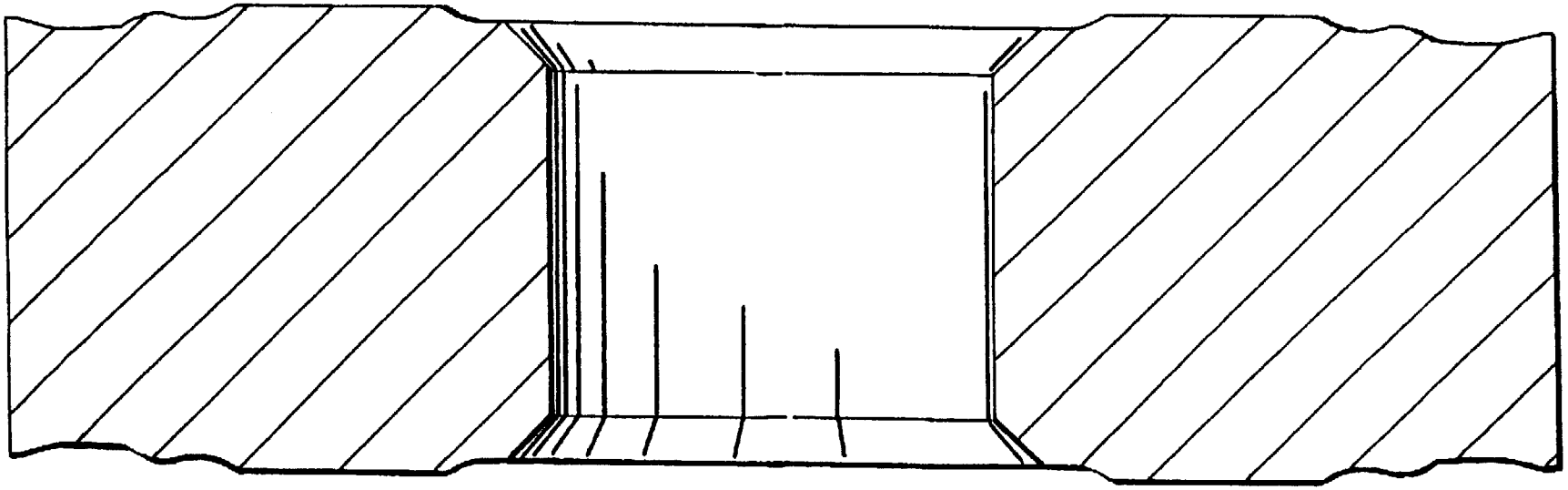
Figure 21:
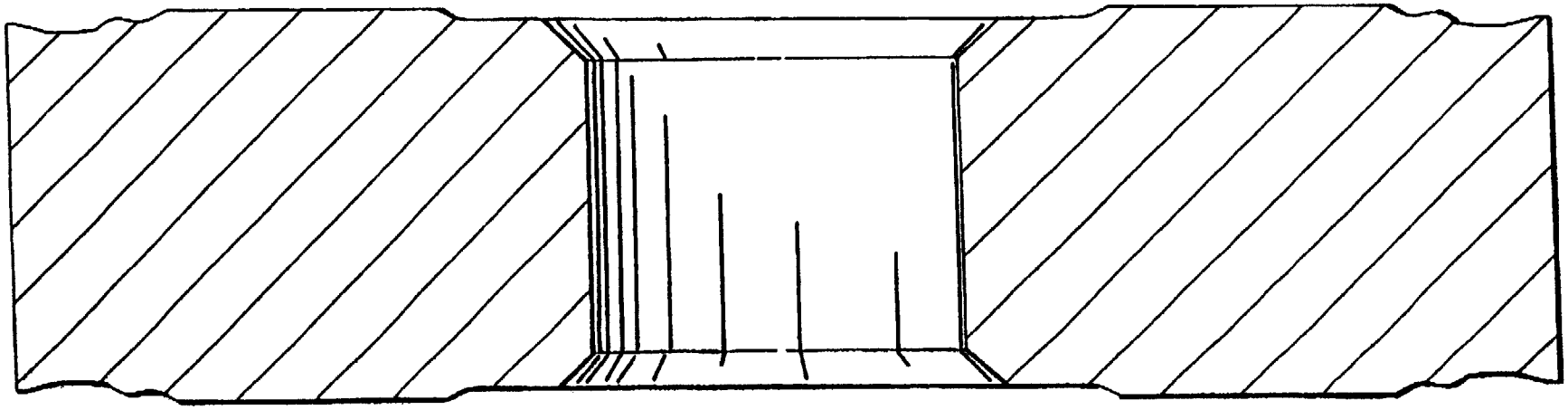
Figure 22:
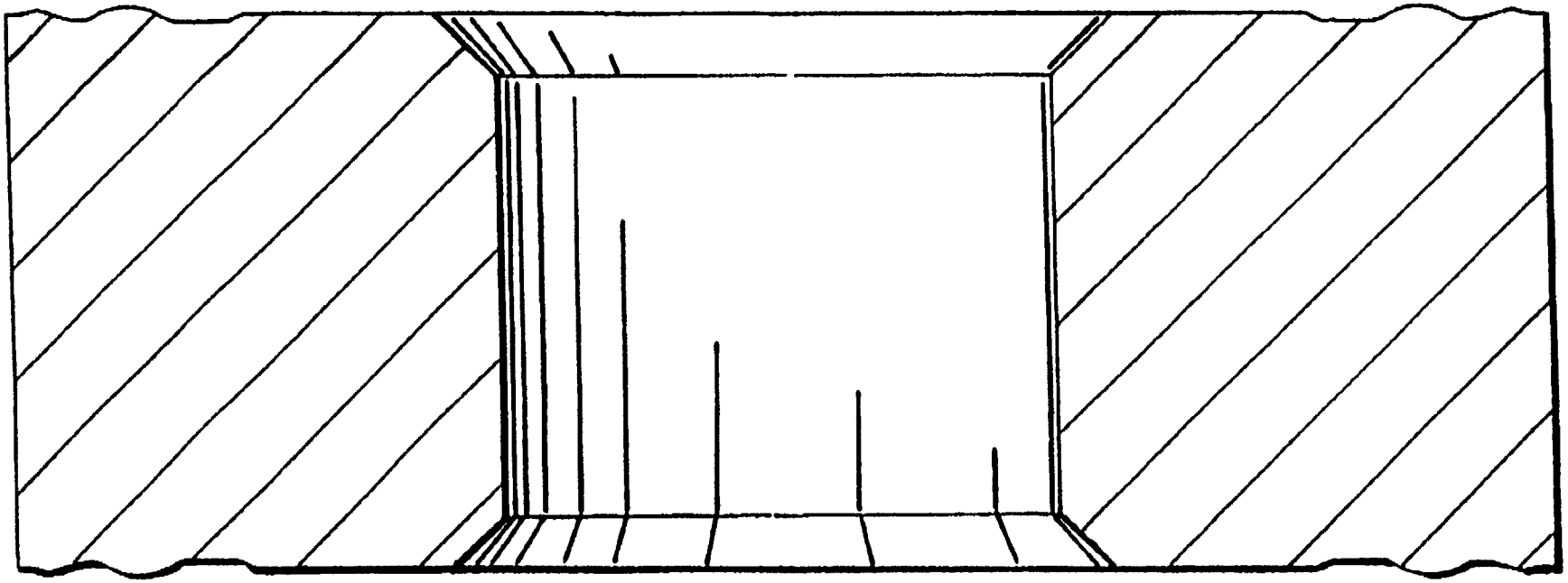
Figure 23:
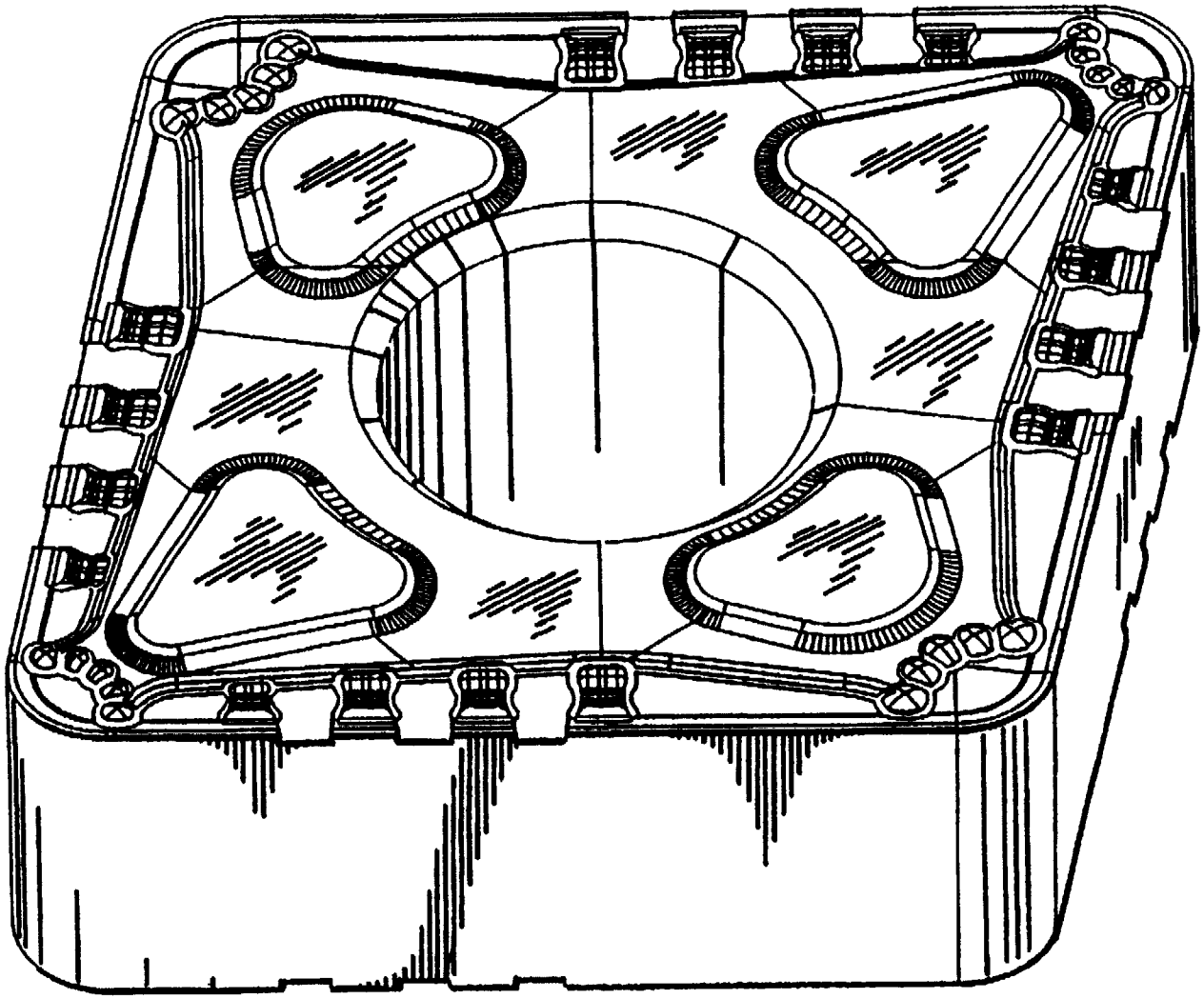
Figure 24:
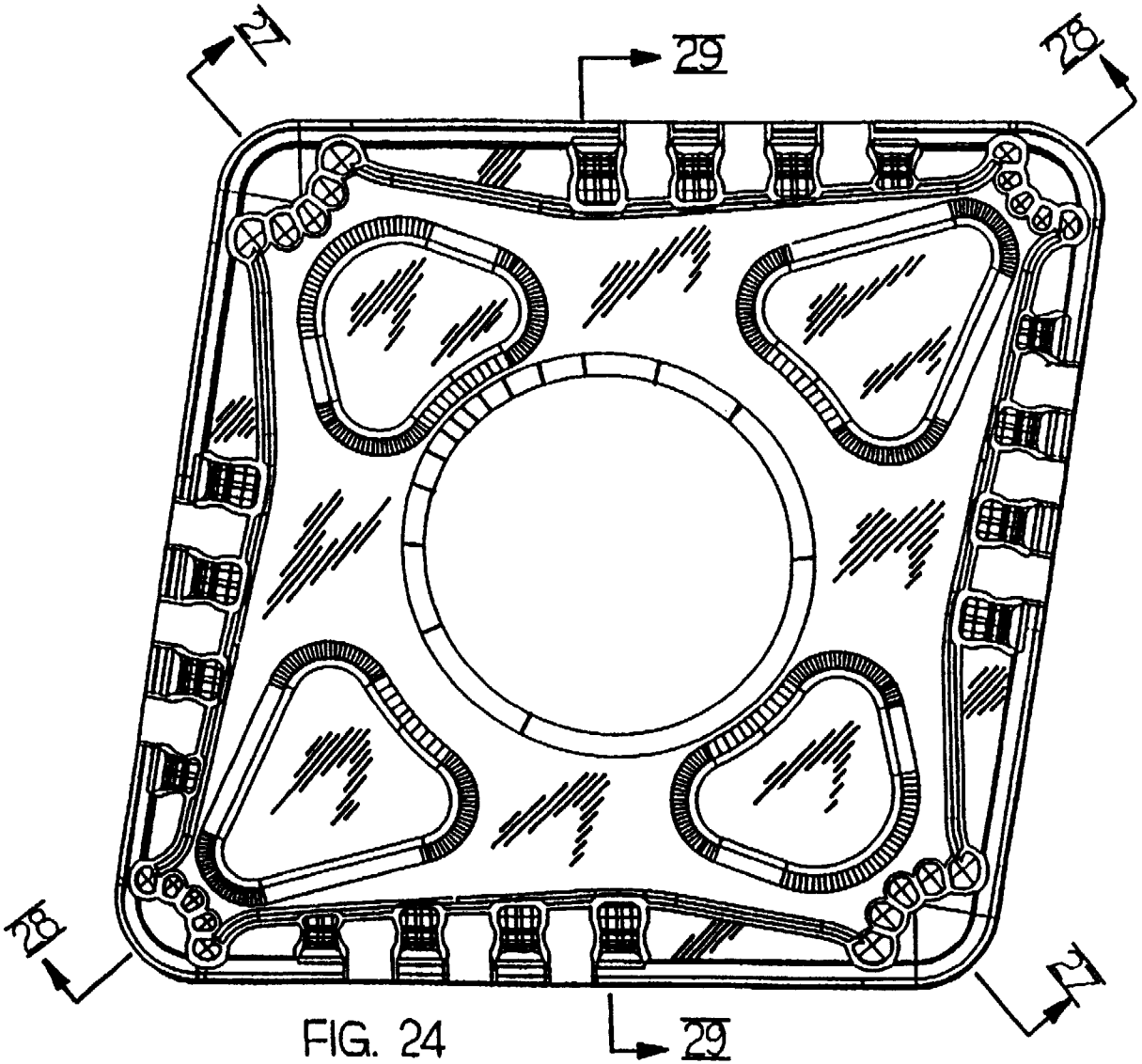
Figure 25:
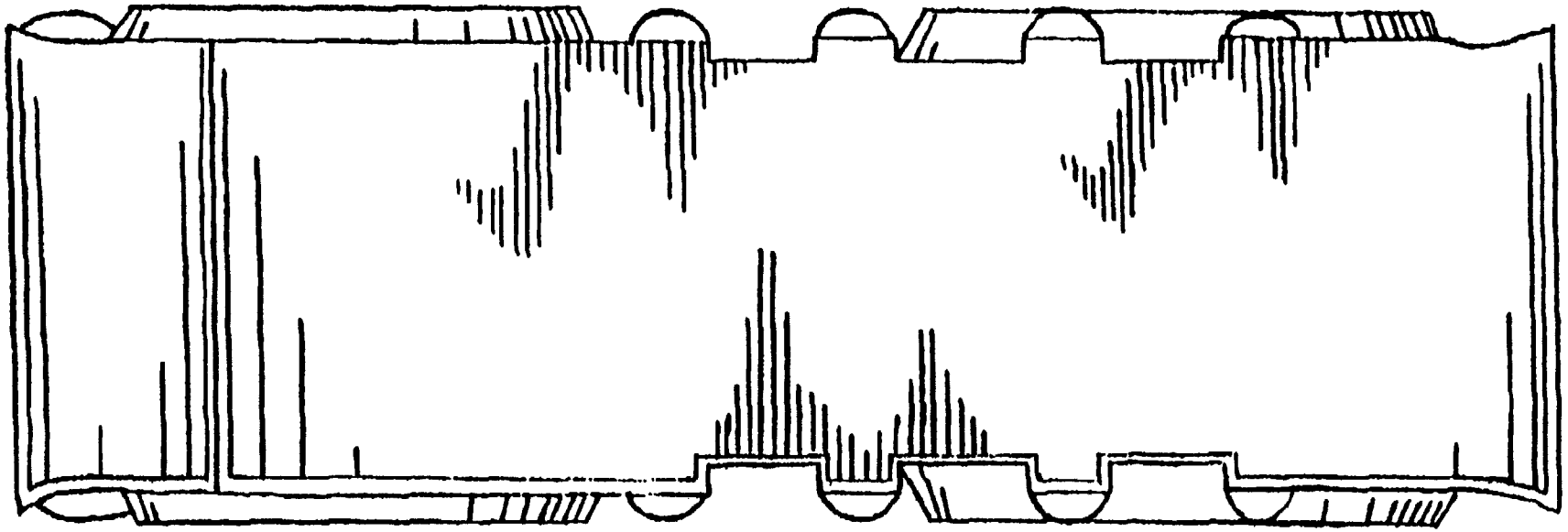
Figure 26:
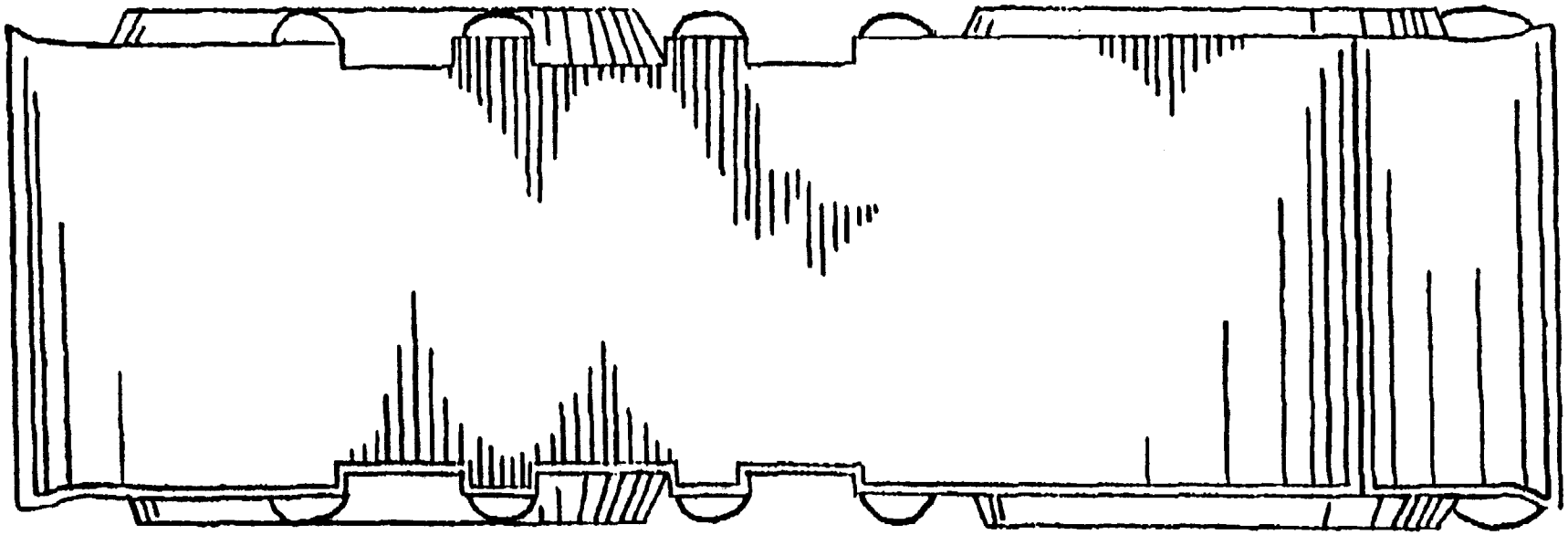
Figure 27:
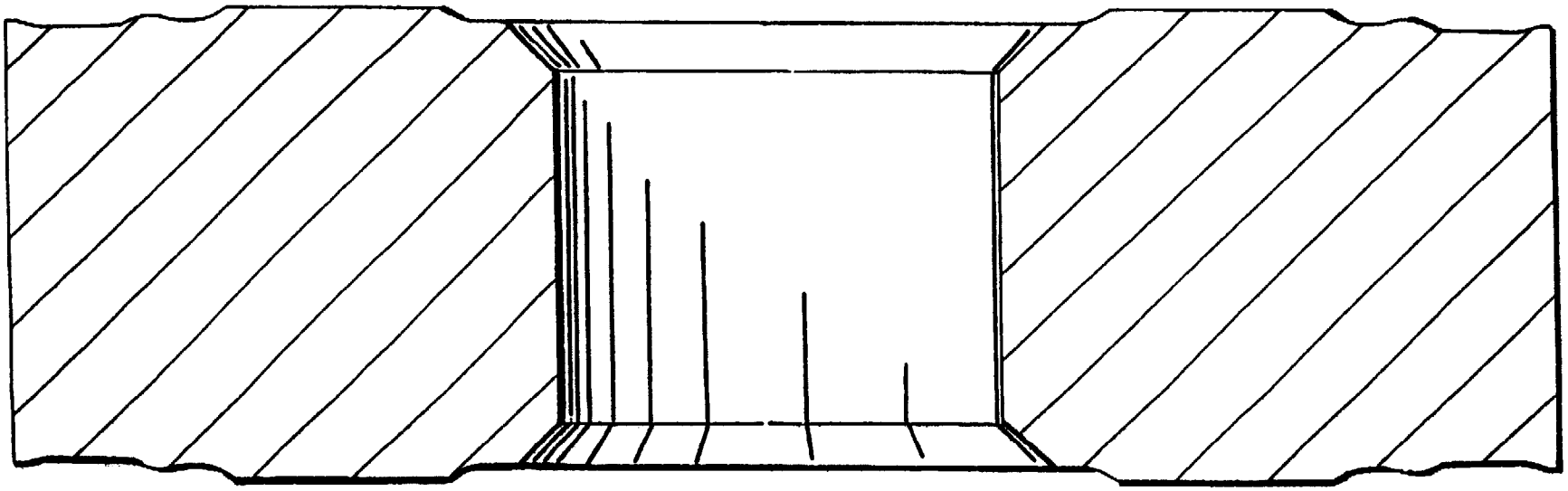
Figure 28:
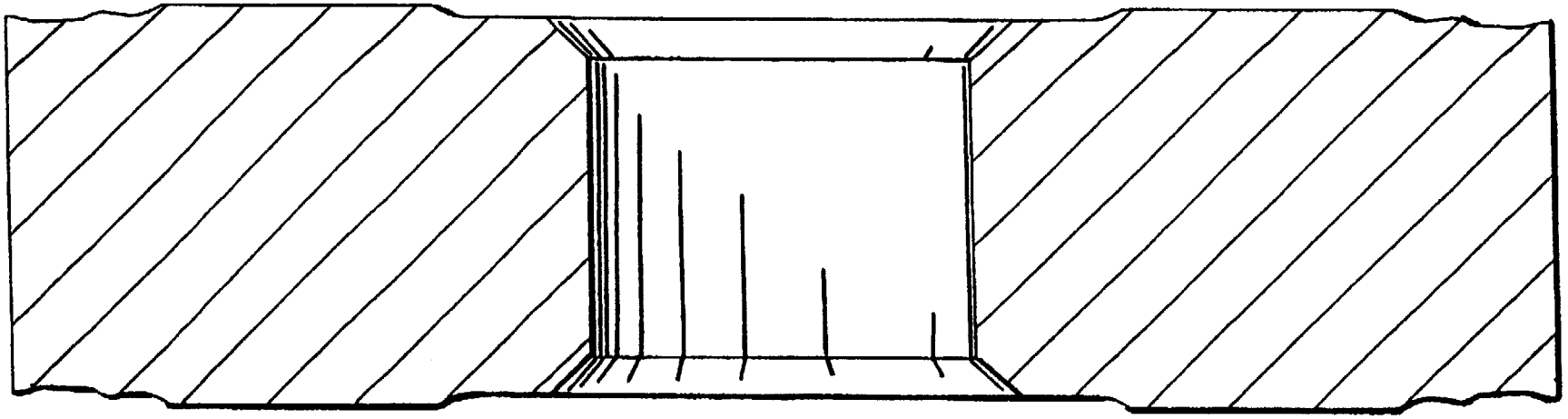
Figure 29:
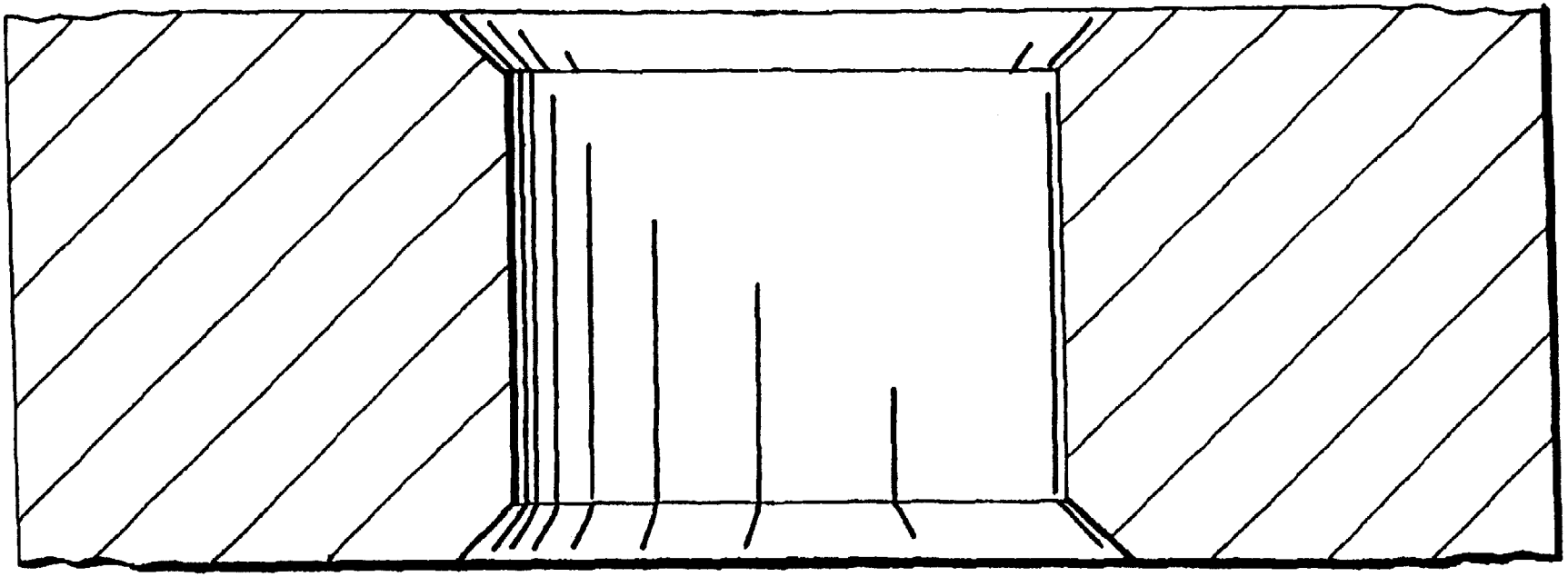

Matter enclosed in heavy brackets [] appears in the original patent, but forms no part of this reissue; matter printed in italics indicates the additions made by reissue.

UNITED STATES PATENT AND TRADEMARK OFFICE

CERTIFICATE OF CORRECTION

PATENT NO. : RE 37,149 E
DATED : May 1, 2001
INVENTOR(S) : Rudi Hartlohner et al.

It is certified that error appears in the above-identified patent and that said Letters Patent is hereby corrected as shown below:

Title page,
Item [63], Related U.S. Patent Documents, Patent No. "Des. 40,963" should read -- Des. 409,632 --.

Signed and Sealed this

Fifth Day of November, 2002

*Attest:*

*Attesting Officer*

JAMES E. ROGAN
*Director of the United States Patent and Trademark Office*